United States Patent [19]
Brown et al.

[11] Patent Number: 5,455,863
[45] Date of Patent: Oct. 3, 1995

[54] METHOD AND APPARATUS FOR EFFICIENT REAL-TIME AUTHENTICATION AND ENCRYPTION IN A COMMUNICATION SYSTEM

[75] Inventors: Daniel P. Brown, Elmhurst; Louis D. Finkelstein, Wheeling; Jeffrey C. Smolinske, Hoffman Estates, all of Ill.

[73] Assignee: Motorola, Inc., Schaumburg, Ill.

[21] Appl. No.: 84,664

[22] Filed: Jun. 29, 1993

[51] Int. Cl.⁶ .................................. H04L 9/32; H04B 1/69
[52] U.S. Cl. .................................. 380/23; 380/25; 380/34; 380/49; 375/200; 455/33.1; 455/53.1; 455/54.1; 379/58; 379/59
[58] Field of Search ................. 340/825.31, 825.34; 455/33.1, 53.1, 54.1, 54.2; 379/58–60

[56] References Cited

U.S. PATENT DOCUMENTS

| | | | |
|---|---|---|---|
| 4,747,050 | 5/1988 | Brachtl et al. | 380/24 X |
| 4,755,940 | 7/1988 | Brachtl et al. | 380/24 X |
| 5,077,790 | 12/1991 | D'Amico et al. | 380/23 |
| 5,091,942 | 2/1992 | Dent | 379/59 X |
| 5,136,646 | 8/1992 | Haber et al. | 380/49 |
| 5,136,647 | 8/1992 | Haber et al. | 380/49 |
| 5,189,700 | 2/1993 | Blandford | 380/23 |
| 5,237,612 | 8/1993 | Raith | 380/23 |
| 5,239,294 | 8/1993 | Flanders et al. | 340/825.34 |
| 5,347,580 | 9/1994 | Molva et al. | 380/25 |
| 5,355,413 | 10/1994 | Ohno | 380/24 |

*Primary Examiner*—Bernarr E. Gregory
*Attorney, Agent, or Firm*—Shawn B. Dempster; Kevin A. Buford

[57] ABSTRACT

Radio frequency based cellular telecommunication systems often require both subscriber units and communication units of a fixed network communication system to maintain secret data which may be used to verify authenticity as well as provide encrypting variables for message encryption processes. An efficient real-time authentication method and apparatus are provided which use a single message to provide authentication and communication link setup information. Further, an authentication method and apparatus are provided which uses instant-specific information such as a time of day, radio frequency carrier frequency, a time slot number, a radio port number, access manager identifier, a radio port control unit identifier, or a base site controller identifier to enhance the reliability of the authentication process. Furthermore, a method and apparatus are provided for maintaining secure packet data communications through an encryption process by utilizing a packetized message encryption key and a unique packet number as encryption variables.

34 Claims, 4 Drawing Sheets

METHOD AND APPARATUS FOR EFFICIENT REAL-TIME AUTHENTICATION AND ENCRYPTION IN A COMMUNICATION SYSTEM

FIELD OF THE INVENTION

The present invention relates to communication systems and, more particularly, to authentication and encryption within communication systems.

BACKGROUND OF THE INVENTION

Many communications systems currently use authentication and encryption to enhance security of the systems. These communication systems include cellular radio telephone communication systems, personal communication systems, paging systems, as well as wireline and wireless data networks. By way of example a cellular communication system will be described below; however, it will be appreciated by those skilled in the art that the authentication and encryption techniques described can be readily extended to other communication systems without departing from the scope and spirit of the present invention. Turning now to cellular communication systems, these systems typically include subscriber units (such as mobile or portable units) which communicate with a fixed network communication unit via radio frequency (RF) communication links. A typical cellular communication system includes at least one base station (i.e., communication unit) and a switching center. The switching center that a subscriber unit accesses may not be his "home" switching center. In this case, the subscriber unit is termed a roaming subscriber unit. The switching center which the subscriber unit accessed (termed the "visited" switching center) must communicate with his "home" switching center via the public switched telephone network (PSTN) or other type of connection such as a satellite link to retrieve information about the subscriber unit and provide service billing information back to the "home" switching center (i.e. "home" communication system).

One responsibility of the fixed network communication unit is to grant use of the communication system to the subscriber unit after the requesting subscriber unit meets the authentication requirements of the system. In a typical cellular telephone communication system, each subscriber unit is assigned a telephone number (mobile identification number) (MIN) (hereinafter referred to as a first subscriber unit identifier) and an identification number (or serial number) (SN) (hereinafter referred to as a second subscriber unit identifier) which uniquely identifies the subscriber to any fixed network communication unit. Each subscriber unit has a unique identification number that distinguishes it from other subscriber units. The fixed network communication unit has access to these identification numbers through a database. Often these numbers are used by the fixed network communication units to bill subscribers for the time the subscriber uses the system. In the case of a roaming subscriber unit, the "visited" switching center must communicate with the subscriber's "home" system database to authenticate and bill the subscriber unit. If this communication is required for each call a subscriber unit makes, significant call setup delays will occur. When the subscriber calls another unit, he enters the phone number (i.e., dialed digits) to be called. The dialed phone number becomes the data to be sent to the fixed network communication unit. Data may also include other information regarding a third communication unit such as a unit's location.

Detection of a legitimate subscriber's identification number may be accomplished by RF eavesdropping or by purposeful or inadvertent divulgence of the MIN/SN combination by the radio telephone installer. Once the subscriber's telephone number and identification number is known (stolen), a thief may reprogram another subscriber unit with the stolen identification number causing two or more subscriber units to have the same MIN/SN combination. Cellular radio telephone systems have authentication procedures to deny access to subscribers not having legitimate identification numbers, but do not have the capability to detect multiple users or effectively neutralize the effect of an installer leaking subscriber identification numbers. Therefore, the legitimate user is billed for both the thief's use and his own use.

Several authentication techniques are known. EIA-553 section 2.3 specifies that each subscriber shall have a MIN and a factory set SN. The telephone number which the subscriber is attempting to contact is the data that is transmitted by the subscriber to the fixed network communication unit. Authentication is granted by this system if the MIN and corresponding SN are found in the fixed network communication unit database. Unfortunately, EIA-553 does not require the encipherment of the MIN or SN before transmission to the fixed network communication unit thereby permitting direct RF detection of any MIN or SN. In addition, this technique fails to provide protection against a thief that acquires a MIN/SN from an installer.

Another authentication technique is described in European cellular communication system recommendations generated by the Groupe Special Mobile (GSM); see sections: 02.09, 02.17, 03.20, and 12.03. This method additionally requires the subscriber to openly transmit a temporary mobile subscriber ID (TMSI) to the fixed network communication unit; the fixed network communication unit generates and sends a random number (RAND) to the subscriber. The enciphering technique requires the subscriber unit to autonomously retrieve at least three enciphering elements from its memory: a predetermined ciphering key, an SN (individual subscriber authentication key) and a MIN (international mobile subscriber identification number—IMSI). The subscriber then enciphers its SN and MIN using the cipher to construct the RAND into a signed response (SRES). The subscriber unit transmits this signed response back to the fixed network communication unit where the fixed network communication unit checks the SN, MIN, and ciphering key against its database using the subscriber's temporary ID (TMSI).

The fixed network communication unit generates its response to the same random number using the information retrieved from the database and compares the subscriber signed response to the fixed network communication unit generated response. If the responses are substantially equivalent, authentication is confirmed. The dialed telephone number is only allowed to be transmitted after authentication is granted. This system affords some protection against a thief that acquires the MIN/SN from an installer by enciphering the SN and reassigning a temporary TMSI each time the subscriber enters a different cell area.

Yet another authentication technique is described in the United States Digital Cellular (USDC) standard (known as IS-54 and IS-55) and published by the Electronic Industries Association (EIA), 2001 Eye Street, N.W., Washington, D.C. 20006. The USDC authentication technique like each of the previously mentioned techniques utilizes a series of specialized messages which must be passed between the subscriber unit and a communication unit of the communication system before system access is granted. However, the USDC technique employs a "global challenge" on the common signaling channel (e.g., a random access channel or a pilot channel) and utilizes shared secret data (SSD) (i.e., encrypting keys known to a subscriber unit and a communication unit which form a communication link) for an authentication (i.e., the $SSD_A$ key) and a voice privacy function (i.e., the $SSD_A$ key). The initial transmitted subscriber message contains an authentication response, but no other data is encrypted. The command to begin an encryption process is sent from the service provider to the subscriber after the subscriber has been assigned a traffic channel.

The problem with each of these authentication techniques is that none of the techniques can provide a traffic channel and enable message encryption on the basis of a single message transmission from the subscriber unit to the communication unit. In addition, the "global challenge" system used in USDC may provide a fraudulent user with an opportunity to mimic the call set-up messages of a legitimate subscriber, if the "global challenge" is not changed often. For example, a user may abort the call set-up process shortly after responding to the "global challenge". If the "global challenge" has not changed, a fraudulent user might mimic the authentication response in order to be assigned a traffic channel to some unwanted target telephone number, because the dialed digits (i.e., telephone number) are included in the authentication response. If encryption is never enabled and the fraudulent user can change the call termination (i.e., who is to be called), then that user can get a free call. Although this scenario is considered to be unlikely, it could become a more significant problem in a densely populated personal communication system. Therefore, a need exists for an authentication technique which can alleviate these problems.

In addition to authentication techniques, many communication systems are also being designed to implement secure/encrypted communications. In these communication systems, a packetized data also needs to be encrypted. Packetized data adds an additional problem to the typical encryption process. This problem arises because packets of data may arrive at different times at a subscriber unit of a communication unit (i.e., packet messages are "connectionless"). These packets need to be reassembled and decrypted in the same order in which they were encrypted. In addition, an encryption key can only be negotiated when a subscriber performs a registration. Therefore, a need exists for an encryption technique which can alleviate these problems associated with packetized data.

SUMMARY OF THE INVENTION

These needs and others are substantially met through provision of the method and apparatus for authentication between a subscriber unit and a communication unit of a communication system. The authentication is accomplished by providing a first subscriber unit identifier, first shared-secret data, second shared-secret data, a random challenge, and instant-specific information to the subscriber unit and the communication unit. In addition, an authentication message is generated as a function of the first shared-secret data, the random challenge, and the instant-specific information. Further, a session key is generated as a function of the first shared-secret data, the second shared-secret data, the random challenge, and the instant-specific information. Furthermore, encrypted data is formed by encrypting dialed digits which uniquely identify a target communication unit and a second subscriber unit identifier by using the session key as an encryption variable. Subsequently, in a single message, the first subscriber unit identifier, the authentication message and the encrypted data is communicated between the subscriber unit and the communication unit. In addition, an expected authentication message is generated as a function of the first shared-secret data, the random challenge, and the instant-specific information. This leads to a determination of whether the communicated authentication message is authentic based upon a comparison of the communicated authentication message with the expected authentication message. If the communicated authentication message is determined to be authentic, then the dialed digits which uniquely identifies the target communication unit and the second subscriber unit identifier are decrypting from the communicated encrypted data by using the session key as an decryption variable and a communication link is established on a traffic channel between the subscriber unit and the communication unit. Otherwise, if the communicated authentication message is determined to not be authentic, then output is provided which indicates that a multiple user is attempting to access the communication system.

Another authentication process is provided which enhances authentication by providing instant-specific information to the subscriber unit and the communication unit. This instant-specific information is used to generate an authentication message as a function of the instant-specific information. The authentication message is communicated between the subscriber unit and the communication unit. In addition, an expected authentication message is generated as a function of the instant-specific information. Finally, a determination is made as to whether the communicated authentication message is authentic by comparing the communicated authentication message and the expected authentication message.

In addition, a method for maintaining secure packet data communications is provided by an encryption process between a subscriber unit and radio communication units of a serving communication system. The encryption process consists of generating a packetized message encryption key within the subscriber unit and the serving communication system. Further, at least one packet of a message to be communicated is numbered with a unique packet number such that a sequential order of the packet in the packetized message can be maintained. This packet of the message is encrypted by using the packetized message encryption key and the unique packet number as encryption variables. The unique pack number and the encrypted packet of the message is communicated between the subscriber unit and a radio communication unit of the serving communication. Finally, the communicated encrypted packet of the message is decrypted by using the generated packetized message encryption key and the communicated unique packet number.

DETAILED DESCRIPTION

Figure 1:
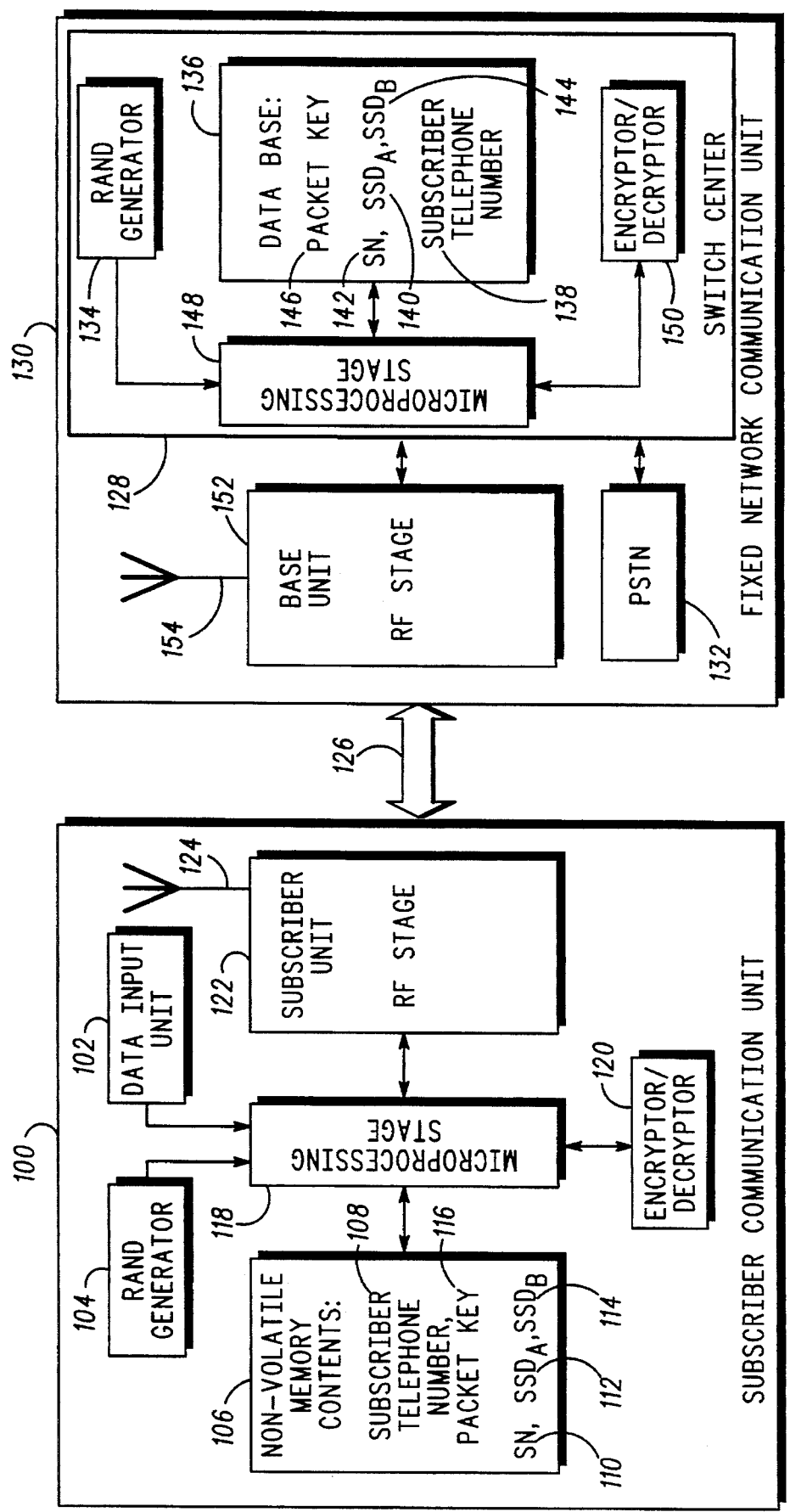
FIG. 1 is a block diagram showing a preferred embodiment communication system having a subscriber unit and a fixed network communication unit in accordance with the present invention.

FIG. 1 generally depicts a subscriber communication unit 100 such as a subscriber telephone and a fixed network communication unit 130 such as a cellular telephone base site and switching center. The subscriber communication unit 100 is comprised of a microprocessing stage 118 which performs many of the preferred embodiment authentication and encryption steps by accessing a non-volatile memory unit 106 and a radio frequency (RF) stage 122. Additional elements which may be accessed by the microprocessing stage 118 include a data input stage 102 such as a key entry pad on a telephone (to enter a telephone number—data), voice, or other data to be transmitted, a random number generator 104 (for generating a random challenge), and an encryption/decryption device 120.

Within the non-volatile memory unit 106 resides the serial number 110 (for the subscriber unit), and the subscriber telephone number 108 (which can have, for example, characteristics of a Mobile Identification Number (MIN) and can be used as a first subscriber unit identifier). The serial number 110 is used as a second subscriber unit identifier which is known only to the subscriber unit and the fixed network unit. For example, it should not be available to an installer of the subscriber unit, it should only be available to a legitimate user of a subscriber unit and a fixed network communication unit database. These identifiers need not necessarily be numbers but may correspond to any attribute capable of being identified by the fixed network communications unit. An alternative embodiment, for example, in a cellular system, may include a stored look up table containing multiple sets of serial numbers, and telephone numbers with each set of identifiers corresponding to a specific cellular area or fixed network communication unit. The memory unit 106 also serves as a storage location for keys generated by the encryption/decryption device 120. These keys may include first shared secret data 112 ($SSD_A$), second shared secret data 114 ($SSD_B$), and third shared secret data 116 (i.e., a packetized data key).

The fixed network communication unit 130 includes a switching center which is comprised of a microprocessing stage 148 which, like the subscriber unit 100, operates in conjunction with a database 136 and a link to a base site radio frequency stage 152 to perform authentication and encryption processes. Additional elements accessed by the microprocessing stage 148 include a random number generator 134 and an encryption/decryption device 150. Additionally, the switching center has an interface to the Public Switched Telephone Network (PSTN) (60). The PSTN link can be used for "visited" switching center to "home" switching center communications as required for authentication and billing of roaming subscriber units.

The database includes information regarding several subscriber units such as a serial number 140 and the associated subscriber telephone number 138 as well as keys associated with the telephone number 138 which may be generated by the encryption/decryption device 150 or received from a "home" switching center. These keys may include first shared secret data 142 ($SSD_A$), second shared secret data 144 ($SSD_B$), and third shared secret data 146 (i.e., a packetized data key). Communication between the subscriber communication unit 100 and the fixed network communication unit 130 is accomplished via RF transmissions 126 between antennae 124 and 154, respectively, of the two units in accordance with well understood cellular system techniques.

Figure 2:
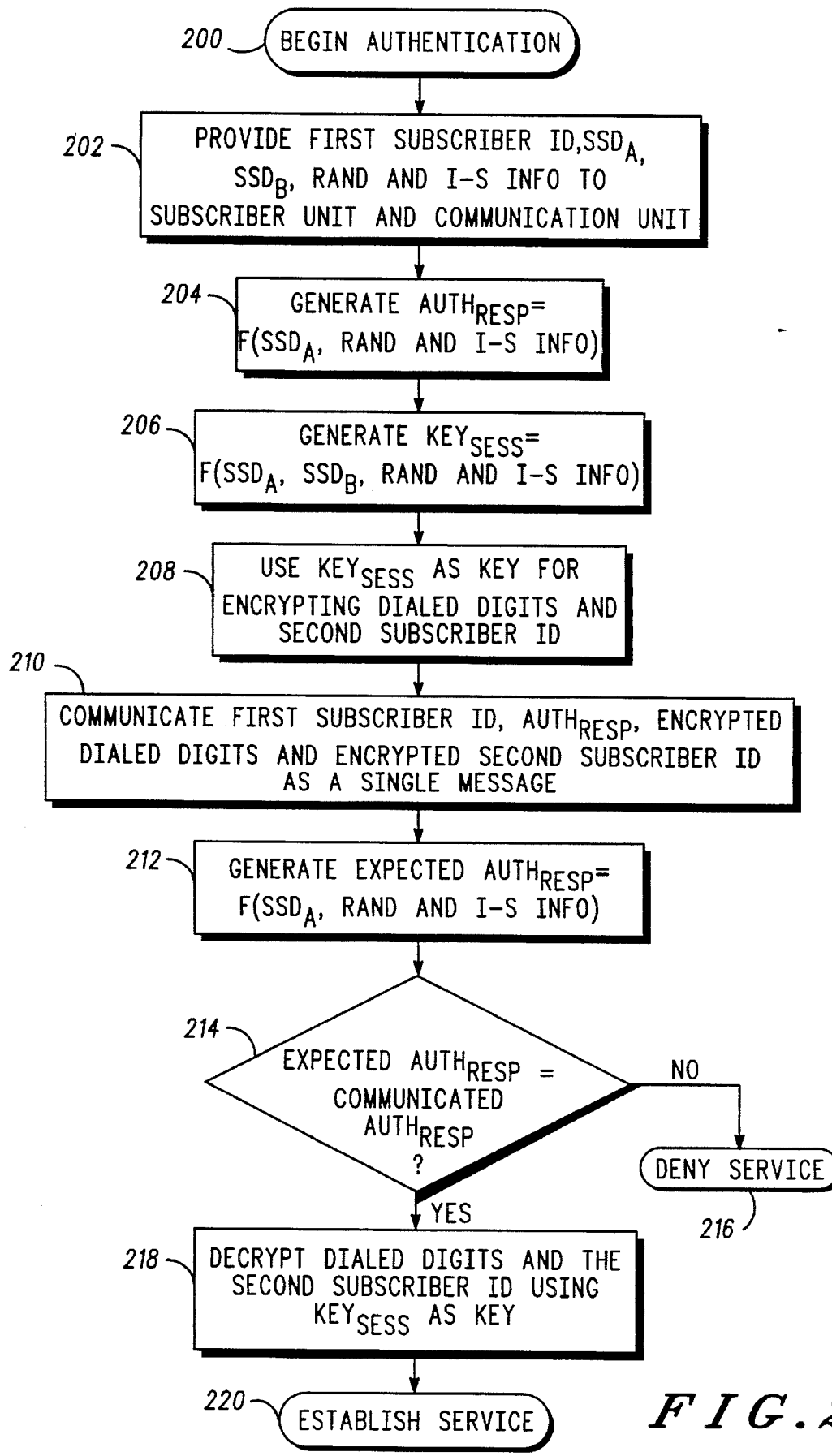
FIG. 2 is a flow chart of a preferred embodiment authentication method used by either a subscriber unit or a fixed network communication unit in accordance with the present invention.

The subscriber unit 100 and fixed network communication unit 130 preferably perform authentication according to a substantially analogous method as shown in FIG. 2. The method of authentication 200 between a subscriber unit and a communication unit of a communication system preferably includes providing 202 a first subscriber unit identifier, first shared-secret data ($SSD_A$), second shared-secret data ($SSD_B$), a random challenge (RAND), and instant-specific information (I-S INFO) to the subscriber unit 100 and the communication unit 130. In addition, the method includes generating 204 an authentication message ($AUTH_{RESP}$) as a function of the first shared-secret data, the random challenge, and the instant-specific information. This generation 204 of the authentication message is preferably performed by a "one-way" encryption which is not capable of being decrypted fast enough (e.g., real-time decrypted) by a fraudulent user. One such "one-way" encryption scheme is known as the Digital Signature Algorithm which was developed by the National Institute for Science and Technology as described in U.S. patent application No. 07/736,451, filed Jul. 26, 1991, now U.S. Pat. No. 5,231,668. It will be appreciated by those skilled in the art that any "one-way" encryption algorithm may be used in this authentication process without departing from the scope and spirit of the present invention. Also, a session key is generated 206 as a function of the first shared-secret data, the second shared-secret data, the random challenge, and the instant-specific information. Further, encrypted data is formed 208 by encrypting dialed digits which uniquely identify a target communication unit and a second subscriber unit identifier by using the session key as an encryption variable. Subsequently, in a single message, the first subscriber unit identifier, the authentication message and the encrypted data is communicated 210 between the subscriber unit 100 and the communication unit 130. The authenticating unit (i.e., the subscriber unit 100 or communication unit 130 which receives the communication) generates 212 an expected authentication message as a function of the first shared-secret data, the random challenge, and the instant-specific information is substantially the same manner as was done in step 204. Further, the authenticating unit determines 214 whether the communicated authentication message is authentic by comparing the communicated authentication message and the expected authentication message. As a result, if the communicated authentication message is authentic, then the authenticating unit grants further communication between the subscriber unit 100 and the communication unit 130 by recovering 218 the dialed digits which uniquely identifies the target communication unit and the second subscriber unit identifier by decrypting the communicated encrypted data by using the session key as an decryption variable and establishing 220 a communication link on a traffic channel between the subscriber unit and the communication unit. Otherwise, if the communicated authentication message is not authentic, then the authenticating unit provides 216 output indicating that a multiple user is attempting to access the communication system.

Figure 3:
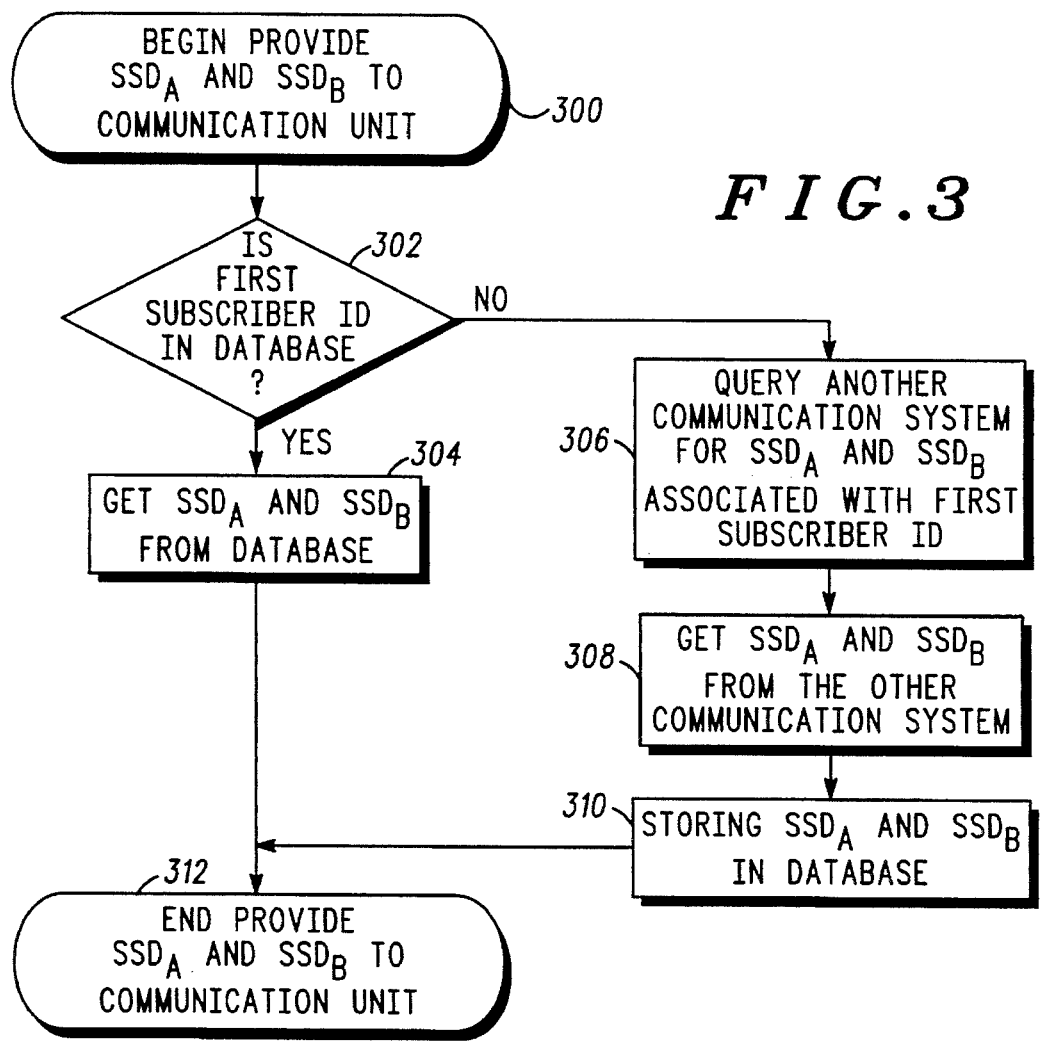
FIG. 3 is a flow chart of a preferred embodiment method for providing shared secret data to the communication unit operating in accordance with the authentication method of the present invention as shown in FIG. 2.

The process 300 of providing first shared-secret data and second shared-secret data to the communication unit 130, as shown in FIG. 3, is preferably defined to include using 302 the communicated first subscriber unit identifier 108, 138 (i.e., subscriber telephone number) to obtain the first shared-secret data 142 and second shared-secret data 144 by retrieving 304 the first shared-secret data 142 and second shared-secret data 144 associated with the first subscriber unit identifier 138, if the communicated first subscriber unit identifier 108 is known by the communication system 130 (i.e., is listed in the database 136). Alternatively, the first shared-secret data 142 and second shared-secret data 144 are obtained by communicating 306 with another communication system (e.g., through the PSTN 132), subsequently retrieving 308 the first shared-secret data 142 and second shared-secret data 144 associated with the communicated first subscriber unit identifier 108, and subsequently storing 310 the first shared-secret data and 142 second shared-secret data 144 in the communication unit 130 database 136, if the communicated first subscriber unit identifier 108 is not known by the communication system 130. As a result 312, the process of providing first shared-secret data and second shared-secret data to the communication unit 130 can be accomplished even if the communication unit 130 does not have a priori knowledge concerning the subscriber unit 130 which is requesting service.

Figure 4:
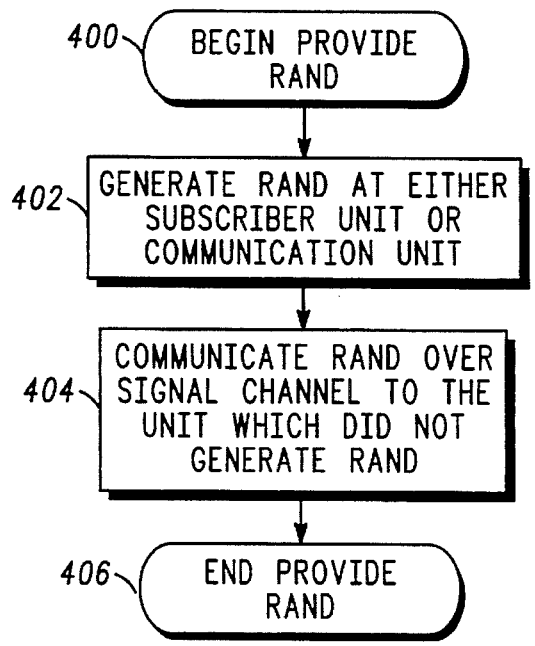
FIG. 4 is a flow chart of a preferred embodiment method for providing a random challenge in accordance with the authentication method of the present invention as shown in FIG. 2.

The process (i.e., steps 400 through 406) of providing a random challenge to the subscriber unit 100 and the communication unit 130, as shown in FIG. 4, is preferably defined to include generating 402 a random challenge at the communication unit 130 and periodically transmitting the random challenge over a common system signal channel 126 which may be received by the subscriber unit 100. Alternatively, the process (i.e., when the subscriber unit 100 is doing the authenticating) may be defined to include generating a random challenge at the subscriber unit 100 and transmitting the random challenge over a signal channel 126 which may be received by the communication unit 130.

The instant-specific information which is used in the authentication process may consist of several types of information which constantly varies, but is available to the subscriber unit 100 and the communication unit 130 at any given time. This instant-specific information may include one or more of the following types of information including a time of day, radio frequency carrier frequency, a time slot number, a radio port number, access manager identifier, a radio port control unit identifier, and a base site controller identifier.

It will be appreciated by those skilled in the art that the authentication method may consist of several variations on the above-described preferred method without departing from the scope and spirit of the present invention. For example, the authentication message and encrypted data may be formed as a function of other types of information available to both the subscriber unit 100 and communication unit 130 such as a rolling key, call counter, or hand-off counter. In addition, more data may be encrypted and communicated as the encrypted data.

Figure 5:
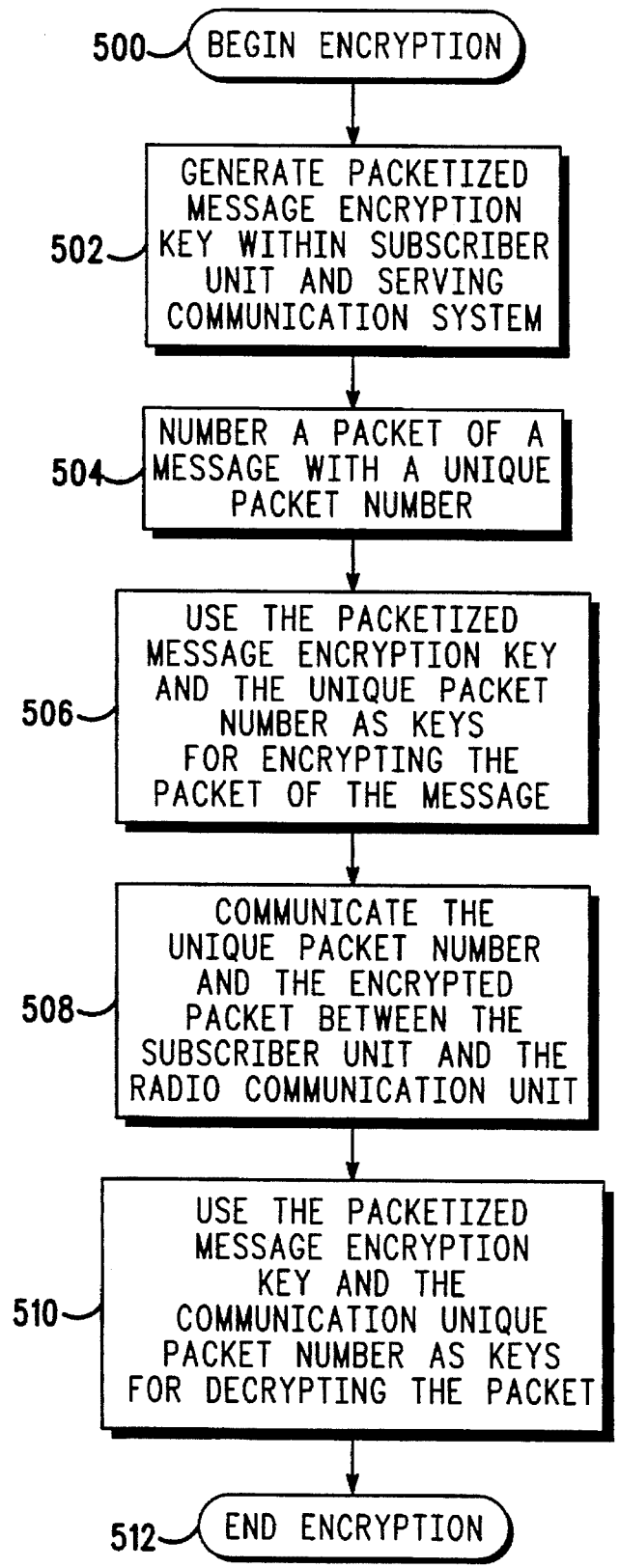
FIG. 5 is a flow chart of a preferred embodiment encryption and decryption method used by either a subscriber unit or a fixed network communication unit in accordance with the present invention.

The subscriber unit 100 and fixed network communication unit 130 preferably perform encryption/decryption according to a substantially analogous method as shown in FIG. 5. The method of maintaining 500 secure packet data communications through an encryption process between a subscriber unit 100 and radio communication units 130 of a communication system preferably includes generating 502 a packetized message encryption key within the subscriber unit 100 and the serving communication system 130. In addition, a packet of a message is numbered 504 with a unique packet number such that a sequential order of the packet in the packetized message can be maintained. For example, if a complete message consists of three packets, then each packet is assigned a unique number which will allow the packet to be joined together to form the complete message. This unique packet number preferably includes an offset number which distinguishes one message from another such that any two messages can be distinguished from one another. Subsequently, the the packet of the message is encrypted 506 by using the packetized message encryption key and the unique packet number as encryption variables. Subsequently, the unique pack number and the encrypted packet of the message is communicated 508 between the subscriber unit 100 and a radio communication unit 130 of the serving communication system. Finally, the communicated encrypted packet of the message can be decrypted 510 by using the generated packetized message encryption key and the communicated unique packet number to complete the secure packet data communication process 512. It will be appreciated by those skilled in the art that each of the remaining packets of the message to be sent can be encrypted and decrypted according to the same process as the single packet described above. Further, it will be appreciated that the packet of the message to be communicated may contain speech information or data information as well as a combination of both types of information.

This method of maintaining secure packet data communication can be utilized in communications being transmitted from the subscriber unit 100 to the communication unit 130. For example, the packet numbering 504 and packet encrypting 506 are performed by the subscriber unit 100. Subsequently, the unique pack number and the encrypted packet of the message is communicated from the subscriber unit 100 to the radio communication unit 130 of the serving communication. Finally, packet decrypting is performed by the radio communication unit 130 of the serving communication. Similarly, the packet numbering 504 and packet encrypting 506 are performed by the communication unit 130. Subsequently, the unique pack number and the encrypted packet of the message is communicated from the radio communication unit 130 to the subscriber unit 100. Finally, packet decrypting 510 is performed by the subscriber unit 100.

Although the invention has been described and illustrated with a certain degree of particularity, it is understood that the present disclosure of embodiments has been made by way of example only and that numerous changes in the arrangement and combination of parts as well as steps may be resorted to by those skilled in the art without departing from the spirit and scope of the invention as claimed. For example, the communication channel could alternatively be an electronic data bus, wireline, optical fiber link, satellite link, or any other type of communication channel.

What is claimed is:

1. A subscriber unit which generates authentication messages for authenticating communications with a communication unit of a communication system, comprising:

(a) memory means for maintaining first subscriber unit identifier, first shared-secret data, second shared-secret data, a random challenge, and instant-specific information;

(b) processor means, coupled to the memory means, for generating an authentication message as a function of the first shared-secret data, the random challenge, and the instant-specific information;

(c) key generation means, coupled to the memory means, for generating, a session key as a function of the first shared-secret data, the second shared-secret data, the random challenge, and the instant-specific information;

(d) encrypting means, coupled to the key generation means, for forming encrypted data by encrypting dialed digits which uniquely identify a target communication unit and a second subscriber unit identifier by using the session key as an encryption variable; and (e) transmitter means, coupled to the memory means, processor means, and key generation means, for transmitting, in a single message, the first subscriber unit identifier, the authentication message and the encrypted data to the communication unit.

2. The subscriber unit of claim 1 further comprising receiving means, coupled to the memory means, for receiving the random challenge over a common system signal channel and storing the random challenge in the memory means.

3. The subscriber unit of claim 1 wherein the instant-specific information comprises information selected from the group consisting of a time of day radio frequency carrier frequency, a time slot number, a radio port number, access manager identifier, a radio port control unit identifier, and a base site controller identifier.

4. A communication unit which authenticates communications from a subscriber unit of a communication system, comprising:

(a) receiver means for receiving, in a single message, a first subscriber unit identifier, an authentication message and encrypted data;

(b) memory means for maintaining first shared-secret data, second shared-secret data, a random challenge, and instant-specific information;

(c) key generation means, coupled to the memory means, for generating, a session key as a function of the first shared-secret data, the second shared-secret data, the random challenge, and the instant-specific information; and (d) processor means, coupled to the receiver means, the memory means, and the key generation means, for authenticating the received authentication message, comprising:

(i) generator means for generating an expected authentication message as a function of the first shared-secret data, the random challenge, and the instant-specific information;

(ii) comparison means for comparing the received authentication message and the expected authentication message;

(iii) means for recovering the dialed digits which uniquely identifies the target communication unit and the second subscriber unit identifier by decrypting the communicated encrypted data by using the session key as an decryption variable and for establishing a communication link on a traffic channel with between the subscriber unit and the communication unit, if the received authentication message is substantially similar to the expected authentication message; and (iv) means for providing output indicating that a multiple user is attempting to access the communication system, if the received authentication message is not substantially similar to the expected authentication message.

5. The communication unit of claim 4 wherein the processor means comprises means for using the received first subscriber unit identifier to obtain the first shared-secret data and second shared-secret data by:

(a) retrieving the first shared-secret data and second shared-secret data associated with the first subscriber unit identifier from the memory means, if the communicated first subscriber unit identifier is known by the communication system; and (b) communicating with another communication system, subsequently retrieving the first shared-secret data and second shared-secret data associated with the first subscriber unit identifier, and subsequently storing the first shared-secret data and second shared-secret data in memory means, if the communicated first subscriber unit identifier is not known by the communication system.

6. The communication unit of claim 4 further comprising means for generating a random challenge and means for periodically transmitting the random challenge over a common system signal channel to the subscriber unit.

7. The communication unit of claim 4 wherein the instant-specific information comprises information selected from the group consisting of a time of day, radio frequency carrier frequency, a time slot number, a radio port number, access manager identifier, a radio port control unit identifier, and a base site controller identifier.

8. A communication unit which generates authentication messages for authenticating communications with a subscriber unit operating within a communication system, comprising:

(a) memory means for maintaining first shared-secret data, second shared-secret data, a random challenge, and instant-specific information;

(b) processor means, coupled to the memory means, for generating an authentication message as a function of the first shared-secret data, the random challenge, and the instant-specific information;

(c) key generation means, coupled to the memory means, for generating, a session key as a function of the first shared-secret data, the second shared-secret data, the random challenge, and the instant-specific information;

(d) encrypting means, coupled to the key generation means, for forming encrypted data by encrypting a second subscriber unit identifier by using the session key as an encryption variable; and (e) transmitter means, coupled to the memory means, processor means, and key generation means, for transmitting, in a single message, the authentication message and the encrypted data to the subscriber unit.

9. The communication unit of claim 8 further comprising receiving means, coupled to the memory means, for receiving the random challenge over a common system signal channel and storing the random challenge in the memory means.

10. The communication unit of claim 8 wherein the instant-specific information comprises information selected from the group consisting of a time of day, radio frequency carrier frequency, a time slot number, a radio port number, access manager identifier, a radio port control unit identifier, and a base site controller identifier.

11. A subscriber unit which authenticates communications from a communication unit of a communication system, comprising:

(a) receiver means for receiving, in a single message, an authentication message and encrypted data;

(b) memory means for maintaining first shared-secret data, second shared-secret data, a random challenge, and instant-specific information;

(c) key generation means, coupled to the memory means, for generating, a session key as a function of the first shared-secret data, the second shared-secret data, the random challenge, and the instant-specific information; and (d) processor means, coupled to the receiver means, the memory means, and the key generation means, for authenticating the received authentication message, comprising:

(i) generator means for generating an expected authentication message as a function of the first shared-secret data, the random challenge, and the instant-specific information;

(ii) comparison means for comparing the received authentication message and the expected authentication message;

(iii) means for recovering the second subscriber unit identifier by decrypting the communicated encrypted data by using the session key as an decryption variable and for establishing a communication link on a traffic channel with between the subscriber unit and the communication unit, if the received authentication message is substantially similar to the expected authentication message; and (iv) means for providing output indicating that a multiple user is attempting to access the communication system, if the received authentication message is not substantially similar to the expected authentication message.

12. The subscriber unit of claim 11 further comprising means for generating a random challenge and means for transmitting the random challenge over a signal channel to the communication unit.

13. The subscriber unit of claim 12 wherein the instant-specific information comprises information selected from the group consisting of a time of day, radio frequency carrier frequency, a time slot number, a radio port number, access manager identifier, a radio port control unit identifier, and a base site controller identifier.

14. A method of authentication between a subscriber unit and a communication unit of a communication system, comprising:

(a) providing a first subscriber unit identifier, first shared-secret data, second shared-secret data, a random challenge, and instant-specific information to both the subscriber unit and the communication unit;

in a transmitting one of the subscriber unit and the communication unit:

(b) generating an authentication message as a function of the first shared-secret data, the random challenge, and the instant-specific information;

(c) generating, a session key as a function of the first shared-secret data, the second shared-secret data, the random challenge, and the instant-specific information;

(d) forming encrypted data by encrypting dialed digits which uniquely identify a target communication unit and a second subscriber unit identifier by using the session key as an encryption variable;

(e) communicating, in a single message, the first subscriber unit identifier, the authentication message and the encrypted data between the subscriber unit and the communication unit; and in a receiving one of the communication unit and the subscriber unit:

(f) generating an expected authentication message as a function of the first shared-secret data, the random challenge, and the instant-specific information;

(g) receiving the communicated authentication message and determining whether the communicated authentication message is authentic by comparing the communicated authentication message and the expected authentication message;

if the communicated authentication message is authentic, (h) recovering the dialed digits which uniquely identifies the target communication unit and the second subscriber unit identifier by decrypting the communicated encrypted data by using the session key as an decryption variable;

(i) establishing a communication link on a traffic channel with between the subscriber unit and the communication unit; and if the communicated authentication message is not authentic, (j) providing output indicating that a multiple user is attempting to access the communication system.

15. The method of claim 14 wherein the step of providing first shared-secret data and second shared-secret data to the communication unit comprises using the communicated first subscriber unit identifier to obtain the first shared-secret data and second shared-secret data by:

(a) retrieving the first shared-secret data and second shared-secret data associated with the first subscriber unit identifier, if the communicated first subscriber unit identifier is known by the communication system; and (b) communicating with another communication system, subsequently retrieving the first shared-secret data and second shared-secret data associated with the first subscriber unit identifier, and subsequently storing the first shared-secret data and second shared-secret data in the communication unit, if the communicated first subscriber unit identifier is not known by the communication system.

16. The method of claim 14 wherein the step of providing a random challenge to the subscriber unit and the communication unit comprises generating a random challenge at the communication unit and periodically transmitting the random challenge over a common system signal channel that is received by the subscriber unit.

17. The method of claim 14 wherein the step of providing a random challenge to the subscriber unit and the communication unit comprises generating a random challenge at the subscriber unit and transmitting the random challenge over a signal channel that is received by the communication unit.

18. The method of claim 14 wherein the instant-specific information comprises information selected from the group consisting of a time of day, radio frequency carrier frequency, a time slot number, a radio port number, access manager identifier, a radio port control unit identifier, and a base site controller identifier.

19. A communication unit which authenticates communications with a subscriber unit of a communication system, comprising:

(a) receiver means for receiving an authentication message;

(b) memory means for maintaining instant-specific information; and (c) processor means for authenticating the received authentication message by determining, through the use of the received authentication message and the maintained instant-specific information, whether the received authentication message is authentic, wherein the processor means further comprises:
  (i) means for granting further communication between the subscriber unit and the communication unit, if the received authentication message was derived from the maintained instant-specific information; and
  (ii) means for providing output indicating that a multiple user is attempting to access the communication system, if the received authentication message was not derived from the maintained instant-specific information.

20. The communication unit of claim 19 wherein the instant-specific information comprises information selected from the group consisting of a time of day, radio frequency carrier frequency, a time slot number, a radio port number, access manager identifier, a radio port control unit identifier, and a base site controller identifier.

21. A subscriber unit which authenticates communications with a communication unit of a communication system, comprising:
  (a) receiver means for receiving an authentication message;
  (b) memory means for maintaining instant-specific information; and
  (c) processor means for authenticating the received authentication message by determining, through the use of the received authentication message and the maintained instant-specific information, whether the received authentication message is authentic, wherein the processor means further comprises:
    (i) means for granting further communication between the subscriber unit and the communication unit, if the received authentication message was derived from the maintained instant-specific information; and
    (ii) means for providing output indicating that a multiple user is attempting to access the communication system, if the received authentication message was not derived from the maintained instant-specific information.

22. The subscriber unit of claim 21 wherein the instant-specific information comprises information selected from the group consisting of a time of day, radio frequency carrier frequency, a time slot number, a radio port number, access manager identifier, a radio port control unit identifier, and a base site controller identifier.

23. A method of authentication between a subscriber unit and a communication unit of a communication system, comprising:
  (a) providing instant-specific information to both the subscriber unit and the communication unit;
  in a receiving one of the radio communication unit and subscriber unit:
  (b) generating an authentication message as a function of the instant-specific information;
  (c) communicating the authentication message between the subscriber unit and the communication unit; and
  in a receiving one of the radio communication unit and subscriber unit:
  (d) generating an expected authentication message as a function of the instant-specific information; and
  (e) determining whether the communicated authentication message is authentic by comparing the communicated authentication message and the expected authentication message, wherein the step of determining further comprises:
    (i) granting further communication between the subscriber unit and the communication unit, if the communicated authentication message was derived from the instant-specific information; and
    (ii) providing output indicating that a multiple user is attempting to access the communication system, if the communicated authentication message was not derived from the instant-specific information.

24. The method of claim 23 wherein the instant-specific information comprises information selected from the group consisting of a time of day, radio frequency carrier frequency, a time slot number, a radio port number, access manager identifier, a radio port control unit identifier, and a base site controller identifier.

25. The method of claim 23, wherein:
  (a) the step of generating an authentication message is performed by the subscriber unit;
  (b) the step of communicating comprises communicating the authentication message from the subscriber unit to the communication unit;
  (c) the step of generating the expected authentication message is performed by the communication unit; and
  (d) the step of determining whether the communicated authentication message is authentic is performed by the communication unit.

26. The method of claim 23 wherein:
  (a) the step of generating an authentication message is performed by the communication unit;
  (b) the step of communicating comprises communicating the authentication message from the communication unit to the subscriber unit;
  (c) the step of generating the expected authentication message is performed by the subscriber unit; and
  (d) the step of determining whether the communicated authentication message is authentic is performed by the subscriber unit.

27. A communication device which maintains secure packet data communications through an encryption process between a subscriber unit and radio communication units of a serving communication system, comprising:
  (a) key generating means for generating a packetized message encryption key;
  (b) packet ordering means for numbering a packet of a message with a unique packet number for maintaining a sequential order of the packet in the packetized message; and
  (c) encrypting means, coupled to the key generating means and the packet ordering means, for encrypting the packet of the message by using the packetized message encryption key and the unique packet number as encryption variables.

28. The communication device of claim 27 wherein the communication device is selected from the group consisting of the subscriber unit and the radio communication unit of the serving communication system.

29. A communication device for receiving encrypted packet data communications between a subscriber unit and radio communication units of a serving communication system, comprising:
  (a) key generating means for generating a packetized message encryption key; and (b) decrypting means, coupled to the key generating means, for receiving an encrypted packet data message and decrypting the received packet data message by using the generated packetized message encryption key and a unique packet number which was communicated between the subscriber unit and the radio communication unit of the serving communication.

30. The communication device of claim 29 wherein the communication device is selected from the group consisting of the subscriber unit and the radio communication unit of the serving communication system.

31. A method for maintaining secure packet data communications through an encryption process between a subscriber unit and radio communication units of a serving communication system, comprising:

(a) generating a packetized message encryption key within both the subscriber unit and the serving communication system;

in a receiving one of the radio communication unit and subscriber unit:

(b) numbering a packet of a message with a unique packet number for maintaining a sequential order of the packet in the packetized message;

(c) encrypting the packet of the message by using the packetized message encryption key and the unique packet number as encryption variables;

(d) communicating the unique pack number and the encrypted packet of the message between the subscriber unit and a radio communication unit of the serving communication system; and in a receiving one of the radio communication unit and subscriber unit:

(e) decrypting the communicated encrypted packet of the message by using the generated packetized message encryption key and the communicated unique packet number.

32. The method of claim 31 wherein the packet of the message of the encrypting step comprises information selected from the group consisting essentially of speech information and data information.

33. The method of claim 31 wherein:

(a) the step of numbering is performed by the subscriber unit;

(b) the step of encrypting is performed by the subscriber unit;

(c) the step of communicating comprises communicating the unique pocket number and the encrypted packet of the message from the subscriber unit to the radio communication unit of the serving communication; and (d) the step of decrypting is performed by the radio communication unit of the serving communication;

34. The method of claim 31 wherein:

(a) the step of numbering is performed by the radio communication unit of the serving communication;

(b) the step of encrypting is performed by the radio communication unit of the serving communication;

(c) the step of communicating comprises communicating the unique pack number and the encrypted packet of the message from the radio communication unit of the serving communication to the subscriber unit; and (d) the step of decrypting is performed by the subscriber unit;

\* \* \* \* \*

UNITED STATES PATENT AND TRADEMARK OFFICE
CERTIFICATE OF CORRECTION

PATENT NO. : 5,455,863

DATED : October 3, 1995

INVENTOR(S) : Daniel P. Brown; Louis D. Finkelstein; Jeffrey C. Smolinske

It is certified that error appears in the above-identified patent and that said Letters Patent is hereby corrected as shown below:

Column 16, Line 15 reads "pocket" -- should be "packet"

Column 16, Line 26 reads "pack" -- should be "packet"

Signed and Sealed this

Twentieth Day of February, 1996

Attest:

BRUCE LEHMAN

*Attesting Officer*     *Commissioner of Patents and Trademarks*